United States Patent [19]
Cranford et al.

[11] Patent Number: 5,606,533
[45] Date of Patent: Feb. 25, 1997

[54] DATA ACQUISITION SYSTEM AND METHOD

[75] Inventors: John C. Cranford, Slidell; Douglas N. Lambert, Pearl River, both of La.; Michael Crowe, Gulfport, Miss.

[73] Assignee: The United States of America as represented by the Secretary of the Navy, Washington, D.C.

[21] Appl. No.: 227,639

[22] Filed: Apr. 14, 1994

[51] Int. Cl.$^6$ .............................. G01S 15/00; G11C 7/00
[52] U.S. Cl. ...................... 367/88; 365/189.04; 367/99
[58] Field of Search .................... 367/14, 15, 21, 367/38, 88, 99; 365/189.04; 364/421

[56] References Cited

U.S. PATENT DOCUMENTS

| | | | |
|---|---|---|---|
| 4,855,961 | 8/1989 | Jaffe et al. | 367/88 |
| 4,864,243 | 9/1989 | Reese | 328/110 |
| 4,953,143 | 8/1990 | Higgins et al. | 367/88 |
| 5,283,767 | 2/1994 | McCoy | 367/4 |
| 5,289,432 | 2/1994 | Dhong et al. | 365/230.05 |
| 5,309,408 | 5/1994 | Bick et al. | 367/99 |
| 5,375,089 | 12/1994 | Lo | 365/189.04 |

OTHER PUBLICATIONS

D. N. Lambert et al., Development of a High Resolution Acoustic Seafloor Classification Survey System, Acoustic classification and Mapping of the Seabed, vol. 15, pt. 2. (Presented Apr. 14–16, 1993.)

*Primary Examiner*—Ian J. Lobo
*Attorney, Agent, or Firm*—Thomas E. McDonnell; Ed Miles

[57] ABSTRACT

A ranging and data taking system, useful as an acoustic sediment classification system. The system launches acoustic pulses into a water column above a sediment bed of interest (seafloor, riverbed, etc.) and records echoes from the pulses. The recorded echoes are transmitted to a processor, which uses the echoes to classify the sediment. Disposed between the hardware for data acquisition, and the processor, is S-RAM (static read only memory). This decouples data acquisition and data processing, which increases the speed of the system sufficiently that the system can display processed data, such as sediment contour plots, in virtual real time.

4 Claims, 1 Drawing Sheet

DATA ACQUISITION SYSTEM AND METHOD

BACKGROUND OF THE INVENTION

The invention concerns a generalized method and apparatus for taking ranging data. The invention has special use as an Acoustic Seafloor Classification System, i.e. a system which can map contours of seabeds, riverbeds, and the like, and can identify the depth and constituent layers of the sediment, typically down to several meters.

An acoustic sediment classification system of this general kind was developed by the ELAC division of Honeywell Corporation for the Naval Ocean Research and Development Activity, now a part of the Naval Research Laboratory. The ELAC system has an acoustic transducer to send and receive acoustic pulses, a central signal processor and system controller which receives and processes digitized raw echo data, an analog recorder to record the raw data, and a central storage and data processing computer to store the data, and further process it in accordance with several look-up tables in computer memory. The controller computer causes the transducer to launch an acoustic pulse in the water toward the seabed (or riverbed, lake bed, etc.) and causes the system to listen for echoes of the pulse within preset time windows. Upon reaching the bottom, part of the pulse will reflect at the water-bottom interface, and part will transmit through, in proportion to the differences in acoustic impedance across the water-bottom interface. Similarly, at the interface between each layer of the bottom, similar reflection and transmission will occur. Thus responsive to the pulse from the transducer, a series of echoes will return, spaced in time and of varying amplitudes. The system listens for these echoes during a series of time windows in order to identify when each arrives, and further identifies the amplitude of the echoes in each time window. The data processing computer has a series of look up tables which use these data, to infer the acoustic reflectivity of the interfaces from which the echoes returned, the acoustic impedances of the layers themselves, and the depth of the interfaces. More on the ELAC system is given in the paper by D. N. Lambert, *An Evaluation of the Honeywell ELAC Computerized Sediment Classification System*, Naval Ocean Research and Development Activity Report 169 (August, 1988).

As the Report explains, the ELAC system has yielded important results, but also has significant drawbacks. In order to be sufficiently inexpensive to permit widespread use, as well as sufficiently portable (and user friendly) to take aboard ship, the computers used must be moderately sized, preferably PC's, and certainly no bigger than a modest workstation. Virtually all the active memory in such computers is in the form of Dynamic Random Access Memory, often called D-Ram. D-Ram's main virtue is its plentifulness and inexpensiveness. Its main handicap is that a computer using D-Ram must boost, i.e. "refresh," D-Ram memory frequently, or the memory fades. Although too rapid a process for a human viewer to notice in real time, a significant fraction of such a computer's time and effort is devoted to refreshing D-Ram, which correspondingly slows the computer's other operations. In the ELAC system, this impedes the flow of echo data into the system controller, and further impedes data flow between and through the system controller and the data processing computer.

Static Random Access Memory (S-RAM), i.e. memory which does not need periodic "refreshing," does exit, and if used in place of D-RAM in the ELAC or similar system, would speed processing considerably. Unfortunately, S-RAM is expensive, and would be prohibitively expensive to substitute for D-Ram in the computers of the ELAC system.

Additionally, the ELAC system has no provision for automatically associating with the echo data, the latitude and longitude at which the data were taken, further limiting the ELAC system's usefulness as a survey tool.

SUMMARY OF THE INVENTION

Accordingly, an object of the invention is to improve the speed at which acoustic sediment classification, and bottom contour plotting, can be done.

Another object is to do this to a sufficient extent that classification can be performed, and reduced data plotted and displayed, in situ, and with virtually no cycle stealing.

Another object is to automatically and precisely record and associate with the data the latitude and longitude at which the data were taken.

In accordance with these and other objects made apparent hereinafter, the invention concerns an acoustic sediment classification system which employs an acoustic transducer for launching at an acoustic pulse into water above a sediment bed, a transducer for receiving echoes from the pulse within a preselected plurality of time windows, an analog to digital converter for digitizing the echoes, data acquisition computer for storing and processing the data. The system also has a dual port digital static RAM memory, having two input/output ports in which one of the ports is adapted to receive the digital data from, the other of which ports is adapted to feed the data to memory in the data acquisition computer responsive to commands from said data acquisition computer.

Because the data must flow through the S-RAM memory between data acquisition, and data processing, both acquisition and processing proceed independent of one another. This means that data acquisition need not be halted while processor D-RAM memory refreshes itself, nor does processing need halt while D-RAM memory in the various data acquisition devices refreshes itself. The result is an overall increase in speed that permits data reduction and display, and avoids cycle stealing.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings.

DETAILED DESCRIPTION

Figure 1:
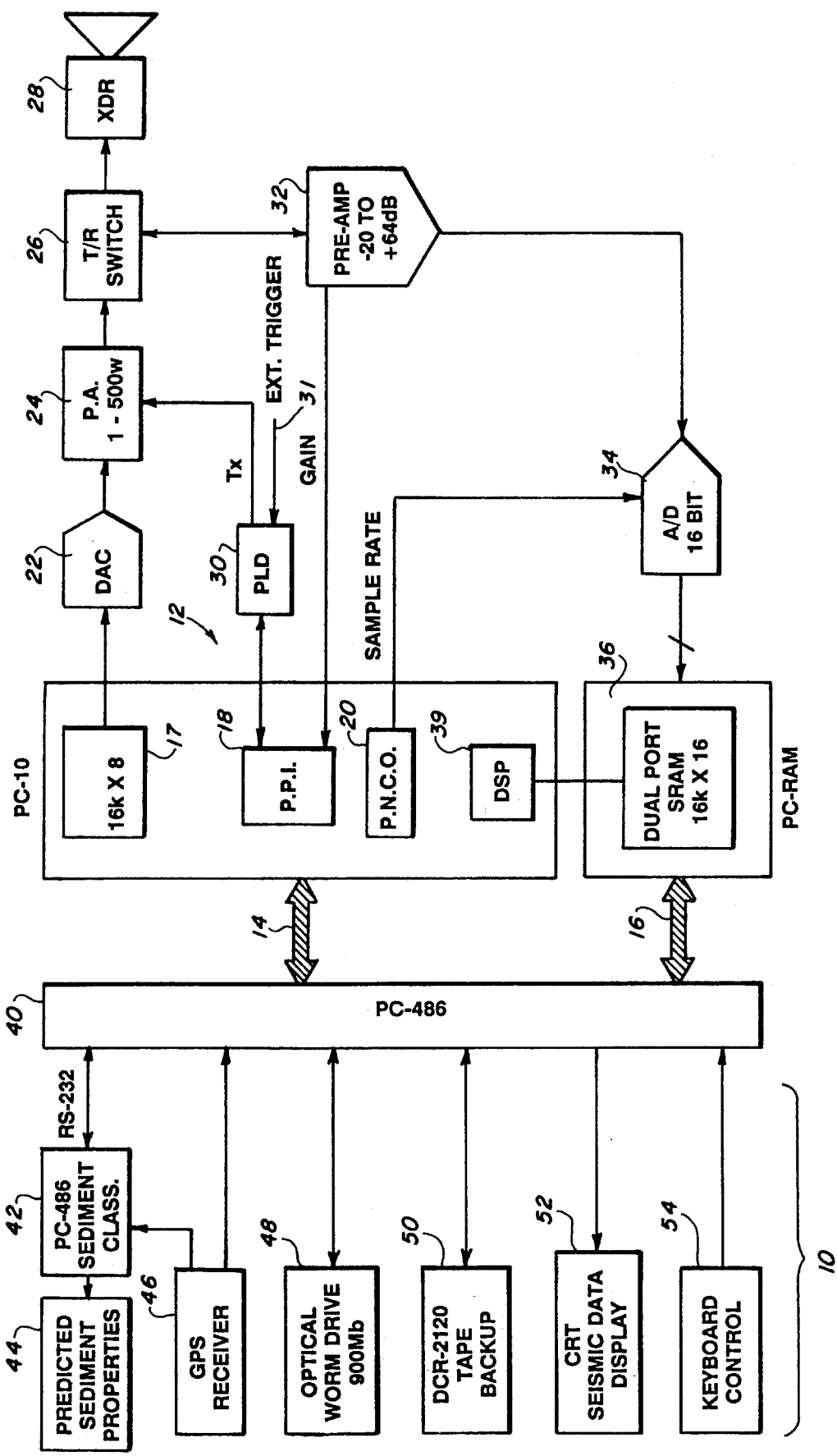
FIG. 1 (the drawing figure) is a schematic block diagram of an electro-acoustic circuit embodying the invention.

FIG. 1 shows a system according to the invention. For convenience, the system can be divided into data acquisition computer 40 and its associated peripherals, indicated generally at 10, interface board 12, dual port S-RAM peripheral memory 36, and, to the right of board 12 on the drawing figure, other system hardware. The processor chips on board 12 directly control this other system hardware, in a manner discussed in more detail below. Data acquisition computer 40, which can be a simple PC using an Intel 486 or better processor, is commanded from operator keyboard 54, and communicates with board 12 via data bus 14, and with S-RAM memory 36 via data bus 16.

Board 12 preferably has a programmable peripheral interface chip 18, which can be preprogrammed to automatically direct specific operations of devices to the right of board 12 on FIG. 2, responsive to initiate commands from computer 40. This arrangement frees the system from operational dependence on computer 40, consequently freeing extra computer time to process the data. Chip 18 is operatively connected to digital pulse generator 17, programmable logic device 30, pre-amplifier 32, and programmable numerically controlled oscillator (clock) 20 towards ends discussed below.

Upon being triggered, digital signal generator 17 produces a digital electronic pulse of a preselected frequency, nominally 15 or 30 kHz. Digital to analog converter 22 converts the pulse into an analog signal, which is amplified in amplifier 24, passed through T/R switch 26 to acoustic transducer 28. Transducer 28, which launches the pulse into the water column above the sediment of interest, is as an acoustic pulse of the same frequency as that generated in member 16. Upon T/R switch being reversed, echoes picked up by transducer 28 will be isolated from the circuit leg containing members 16, 22, 24, and will be directed to preamplifier 32. T/R switch 26 also serves to isolate preamplifier 32 from the high voltage of the pulse exiting amplifier 24, which can typically be up to about 500 volts to ensure that transducer 28 issues a sufficiently strong acoustic pulse.

Output of pre-amplifier 32 goes to analog to digital converter 34 for digitizing. The sample rate for converter 34 is set by oscillator 20, which acts as system clock, and which is preferably a programmable numerically controlled oscillator chip, located on input-output board 12 for convenience. Output of converter 34 reads into S-RAM peripheral memory 36 through one of its two ports. The other port of S-RAM 36 communicates data via bus 16 to data acquisition computer 40, permitting mapping of data to computer 40.

In addition to receiving data from S-RAM 36, computer 40 can read location data from Global Positioning System receiver 46, and can output its data for use by sediment classification computer 42, or to optical drive 48, or to tape backup 50. Data from computer 40 can also be displayed on cathode ray tube 52.

In operation, one would typically begin the data acquisition sequence by entering from keyboard 54 a command to calibrate the system. This command is relayed via bus 16 to interface processor chip 18, along with default settings from the system contained in a setup file in computer 40. Processor 18 uses information in the setup file to set the frequency and duration of pulses output from signal generator 16, and to set the gain of amplifiers 22, 32. In accordance with its preprogramming, interface 18 triggers generator 16 to generate a pulse, which causes transducer 28 to launch a corresponding acoustic pulse in the manner described above. Thereafter, processor 18 reverses T/R switch 26, which permits echoes of the acoustic pulse detected by transducer 28 to be routed to pre-amplifier 32 and analog to digital converter 34. Converter 34, responsive to clock 20, digitizes the output of amplifier 32.

Computer 40 can read this data, and report it, to permit the operator to change the system's operating parameters from those in the setup file, if necessary or desired. For example, computer 40 can identify which window contains the largest amplitude echo, and what that amplitude is. From this, one can adjust gain on amplifiers 24, 32 to ensure that returned data will be within sensor ranges. Knowing the speed of sound in water, one can determine how far down bottom is, and consequently adjust how far apart subsequent acoustic pulses should be to ensure that their echoes do not overlap in time.

Thereafter, the operator can commence data taking by entering the appropriate command from keyboard 54. The manner of data collection is much like that just described. Here, interface chip 18 commands generator chip 16 to begin triggering acoustic pulses at a rate set by the initial settings file, and commands oscillator 20 to begin clocking the process. In the time between sequential acoustic pulses, interface 18 reverses switch 26 to permit echoes detected by transducer 28 to enter preamplifier 32, and which provides a continuous flow of data to amplifier 32, which is continuously digitized in converter 34 in accordance with the time base of oscillator 20. In this manner, a digitized signal envelope of the echo present is recorded in S-RAM 36. Interface chip 18 repeats this cycle continuously until commanded to stop from keyboard 54, or from external trigger 31, resulting in a continuous accumulation of data in S-RAM 36.

Computer 40 maps data continuously from S-RAM 36, preprocesses it continuously for use by computer 42, and offloads the data to computer 42. In preprocessing, computer 40 determines, for each acoustic pulse, which window contains the bottom reflection, and records this information with other data associated with that pulse. This aids subsequent processing of data by computer 42. Computer 40 also associates input from Global Positioning System receiver 46 with the data from each acoustic pulse, to record the latitude and longitude at which the data were taken.

Computer 42 runs sediment classification software which infers sediment type from the echo data for each sediment layer from which the system received an echo. The software used in the ELAC system could do this, but preferably the algorithms used are those disclosed in U.S. Pat. No. 5,559,754, filed simultaneously with this application.

Computer 40 preferably displays the raw echo data from each acoustic pulse on cathode ray tube 52 as it is received, preferably in the form of a vertical, color coded bar graph, in which distance from the top of the bar, and color corresponds to signal intensity.

In the system of FIG. 1, acquired data is deposited in S-RAM 36, and remains there statically, where computer 40 can map the data whenever it is ready to do so. Being S-RAM, memory 36 is permanent until one actively erases it, and needs not be refreshed periodically. It is thus always ready to receive data when data arrives, and ready to map data when computer 40 is ready to receive it. S-RAM 36 thus decouples operation of the data acquisition hardware from operation of the data processing hardware, making each independent of the other's inefficiencies. Most notably, this eliminates the need to halt data acquisition while computer 40 refreshes its D-RAM, and vice versa. The result is a system which is speeded up sufficiently that computers 40 and 42 can process system data through sediment classification software, and display the results in human understandable plots, virtually in real time.

The invention has been described in what is considered to be the most practical and preferred embodiments. It is recognized, however, that obvious modifications to these embodiments may occur to those with skill in this art. Although the foregoing is developed primarily in terms of an acoustic sediment classification system, as discussed above the invention is applicable to any directed beam ranging system, other examples of which are radar or sonar. Accordingly, the scope of the invention is to be discerned solely by reference to the appended claims, wherein:

We claim:

1. An acoustic sediment classification system, comprising:

an acoustic means for launching at least one acoustic pulse into water above said sediment, and for receiving echoes from said at least one acoustic pulse and transducing said echoes into corresponding digital electronic signals;

analog to digital means for converting said corresponding digital electronic signals into digital electronic data;

data acquisition computer means for storing and processing said digital electronic data;

dual port digital static RAM memory, having two input/output ports; wherein one of said ports is adapted to receive said digital electronic data from said analog to digital means; and the other of said ports is adapted to feed said digital electronic data to memory in said data acquisition computer responsive to commands from said data acquisition computer;

wherein said system further comprises a programmable interface means for operating, responsive to an initiation command from said data acquisition computer, said analog to digital means independently of said data acquisition computer.

2. A ranging system, comprising:

means for launching at least one pulse into a medium which can support transmission of said pulse;

transducer means for receiving echoes from said at least one pulse and transducing said echoes into corresponding electronic signals;

analog to digital means for converting said corresponding electronic signals into digital electronic data;

data acquisition computer means for storing and processing said digital electronic data;

dual port digital static RAM memory, having two input/output ports; wherein one of said ports is adapted to receive said digital electronic data from said analog to digital means; and the other of said ports is adapted to feed said digital electronic data to memory in said data acquisition computer responsive to commands from said data acquisition computer;

wherein said system further comprises a programmable interface means for operating, responsive to an initiation command from said data acquisition computer, said means for launching, said transducer means, and said analog to digital means, independently of said data acquisition computer.

3. An acoustic method for sediment classification, comprising:

launching at least one acoustic pulse into water above said sediment;

receiving echoes from said at least one acoustic pulse and transducing said echoes into corresponding electronic signals;

converting said corresponding electronic signals into digital electronic data;

providing a computer for storing and processing said digital electronic data;

providing a dual port digital static RAM memory, having two input/output ports; one of said ports being adapted to receive said digital electronic data from said analog to digital means; the other of said ports being adapted to feed said digital electronic data to memory in said data acquisition computer responsive to commands from said data acquisition computer;

causing writing of said digital electronic signals to storage in said static RAM memory via said one of said ports effective to permit said computer to be able to read said signals in said RAM via said other of said ports; and wherein:

said launching occurs responsive to a command from said computer; and said launching, said receiving, and said converting, are done independently of said computer.

4. An acoustic sediment classification system, comprising:

an acoustic means for launching at least one acoustic pulse into water above said sediment, and for receiving echoes from said at least one acoustic pulse and transducing said echoes into corresponding digital electronic signals;

an analog to digital means for converting said corresponding digital electronic signals into digital electronic data;

data acquisition computer means for storing and processing said digital electronic data;

dual port digital static RAM memory, having two input/output ports; wherein one of said ports is adapted to receive said digital electronic data from said analog to digital means; and the other of said ports is adapted to feed said digital electronic data to memory in said data acquisition computer means responsive to commands from said data acquisition computer means;

said system further comprising:

an input-output electronics interface board;

a command input-output bus operatively disposed to permit communication between said computer means and said input-output electronics interface board;

wherein said board comprises:

a programmable peripheral interface chip, said programmable peripheral interface chip being operatively connected to said command input-output bus for communication with said data acquisition computer means for receipt of command signals;

a digital signal generator; and a programmable numerically controlled oscillator;

wherein said digital signal generator is adapted, responsive to said peripheral interface chip, to generate a digital electronic equivalent of said at least one acoustic pulse;

said programmable numerically controlled oscillator is adapted, responsive to said programmable peripheral interface chip, to generate a digital clocking signal;

wherein said system further comprises:

a digital to analog converter for converting said digital electronic equivalent of said at least one acoustic pulse into an analog electronic equivalent of said at least one acoustic pulse;

an amplifier for selectably modifying the amplitude of said analog electronic equivalent of said at least one acoustic pulse, the gain of said amplifier being selectably adjustable responsive to said programmable peripheral interface chip; and wherein said acoustic means comprises an electro-acoustic transducer adapted, responsive to said analog electronic equivalent of said at least one acoustic pulse, to cause said launching of said at least one acoustic pulse into water above said sediment, said electro-acoustic transducer being further adapted to cause said receiving of said echoes from said at least one acoustic pulse, and said transducing of said echoes into said corresponding digital electronic signals;

wherein said analog to digital means for converting said corresponding digital electronic signals into digital electronic data comprises a pre-amplifier, the gain of said pre-amplifier being selected responsive to said programmable peripheral interface chip, the sample rate of said analog to digital means being set responsive to said digital clocking signal of said programmable numerically controlled oscillator; and wherein said RAM memory is adapted to receive said digital electronic data from said analog to digital converter responsive to said digital clocking signal.

* * * * *